United States Patent
Bae et al.

(10) Patent No.: US 12,422,723 B2
(45) Date of Patent: Sep. 23, 2025

(54) COMPOSITION FOR ELECTROCHROMIC DEVICE HAVING OPTICAL TRANSMISSION, HIGH FLEXIBILITY, AND HIGH MOISTURE RESISTANCE, AND MANUFACTURING METHOD OF ELECTROCHROMIC MEMBER

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Jin Woo Bae, Gyeonggi-do (KR); Seung Ju Oh, Cheonan-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 18/020,433

(22) PCT Filed: Dec. 8, 2021

(86) PCT No.: PCT/KR2021/018512
§ 371 (c)(1),
(2) Date: Feb. 9, 2023

(87) PCT Pub. No.: WO2023/063490
PCT Pub. Date: Apr. 20, 2023

(65) Prior Publication Data
US 2024/0272506 A1    Aug. 15, 2024

(30) Foreign Application Priority Data

Oct. 14, 2021  (KR) .......................... 10-2021-0136307
Oct. 14, 2021  (KR) .......................... 10-2021-0136308

(51) Int. Cl.
*G02F 1/1516*      (2019.01)
*C08K 5/11*        (2006.01)
(Continued)

(52) U.S. Cl.
CPC ............ *G02F 1/15165* (2019.01); *C08K 5/11* (2013.01); *C09K 9/02* (2013.01); *G02F 1/1503* (2019.01);
(Continued)

(58) Field of Classification Search
CPC .... G02F 1/15165; G02F 1/1503; G02F 1/163; G02F 2001/1518; G02F 1/1516; C08K 5/11; C09K 9/02; C09K 2211/1044
See application file for complete search history.

(56) References Cited

U.S. PATENT DOCUMENTS

2011/0003070 A1*  1/2011  Pozo Gonzalo ..... C08K 5/3432
                                                 252/583
2011/0147680 A1   6/2011  Percec et al.
(Continued)

FOREIGN PATENT DOCUMENTS

| JP | 5689071 B2 | 3/2015 |
|---|---|---|
| KR | 10-2018-0099415 A | 9/2018 |
| KR | 10-2078481 B1 | 2/2020 |

OTHER PUBLICATIONS

International Search Report of PCT/KR2021/018512 mailed Jul. 1, 2022.
(Continued)

*Primary Examiner* — Mariam Qureshi
(74) *Attorney, Agent, or Firm* — Revolution IP, PLLC

(57) ABSTRACT

The present invention relates to a composition for an electrochromic device having improved optical transmission and elasticity, and a manufacturing method of an electrochromic member, wherein the composition for an electrochromic device according to an embodiment of the present invention includes a light-transmitting polymer resin, a plasticizer, and an electrochromic material.

11 Claims, 14 Drawing Sheets

(51) Int. Cl.
*C09K 9/02* (2006.01)
*G02F 1/1503* (2019.01)
*G02F 1/163* (2006.01)

(52) U.S. Cl.
CPC ............... *C09K 2211/1044* (2013.01); *G02F 2001/1518* (2019.01); *G02F 1/163* (2013.01)

(56) References Cited

U.S. PATENT DOCUMENTS

2021/0382365 A1* 12/2021 Gogotsi ............... C01B 32/921
2022/0380882 A1* 12/2022 Maniyara ............. G01N 21/31
2024/0151995 A1*  5/2024 Roberts ............... C08K 5/3432

OTHER PUBLICATIONS

Ko, J. et al., "Self-healable electrochromic ion gels for low power and robust displays", Organic electronics, vol. 71, Aug. 2019, pp. 199-205.
Kim, J.-W. et al., "Flexible and transparent electrochromic displays with simultaneously implementable subpixelated ion gel-based viologens by multiple patterning", Advanced functional materials, 2019, vol. 29, No. 13, pp. 1808911(inner pp. 1-9).
Hong Chul Moon et al., "Multicolored, Low-Power, Flexible Electrochromic Devices Based on Ion Gels", ACS Applied Materials & Interfaces, 2016, vol. 8, issue No. 9, pp. 6252-6260.

* cited by examiner

COMPOSITION FOR ELECTROCHROMIC DEVICE HAVING OPTICAL TRANSMISSION, HIGH FLEXIBILITY, AND HIGH MOISTURE RESISTANCE, AND MANUFACTURING METHOD OF ELECTROCHROMIC MEMBER

TECHNICAL FIELD

The present invention relates to a composition for an electrochromic device having optical transmission, high flexibility, and high moisture resistance, and a manufacturing method of an electrochromic member.

BACKGROUND ART

An electrochromic device is a device that includes an electrochromic material and has color changes by voltage applied from the outside. Various materials such as polymer compounds and metal oxides are applied to the electrochromic material, and the color is reversibly changed by voltage applied to the electrode.

Recently, such an electrochromic device is more widely used in areas such as a smart window system that blocks external gaze and sunlight, or automotive glass that displays information including maps and letters.

Typical electrochromic devices use a liquid electrochromic material, and thus cause an electrolyte to leak out, and are not applicable as a flexible display. Recently, a solidified water-based electrolyte has been developed, but a protection layer is required to be additionally installed to prevent water from easily evaporating.

As a related prior art document, there is Korean Patent Registration No. 10-2078481.

DISCLOSURE OF THE INVENTION

Technical Problem

The present invention is to provide a composition for an electrochromic device having improved optical transmission and elasticity, and a manufacturing method of an electrochromic member.

In addition, the composition for an electrochromic device has long lifespan and excellent durability.

In addition, the composition for an electrochromic device has flexibility and elasticity to be applicable to various fields.

In addition, the manufacturing method is simple to increase production efficiency and reduce manufacturing costs.

Technical Solution

A composition for an electrochromic device according to an embodiment of the present invention includes a light-transmitting polymer resin, a plasticizer, and an electrochromic material.

The electrochromic material may be diheptyl viologen dihexafluorophosphate, and contained in an amount of 5 to 20 parts by weight with respect to 100 parts by weight of the polymer resin.

The electrochromic material may be represented by Formula 1 below.

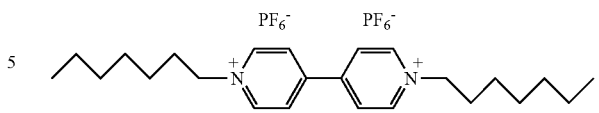

[Formula 1]

The electrochromic material may further include an ionic liquid in an amount of 100 to 200 parts by weight with respect to 100 parts by weight of the polymer resin.

The electrochromic material may be ethyl viologen dibis (trifluoromethanesulfonyl)imide, and contained in an amount of 5 to 14 parts by weight with respect to 100 parts by weight of the polymer resin.

The ethyl viologen dibis (trifluoromethanesulfonyl) imide may be represented by Formula 1 below.

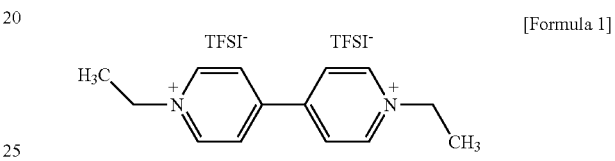

[Formula 1]

An electrochromic device according to an embodiment of the present invention includes a first electrode, a second electrode, and an electrochromic device layer that is discolored by voltage applied to the first electrode and the second electrode, wherein the electrochromic device layer includes the composition for an electrochromic device described above.

A method of manufacturing an electrochromic member according to an embodiment of the present invention includes dissolving a polymer resin, a plasticizer, an ionic liquid, and an electrochromic material in a solvent to prepare a mixed solution, and removing the solvent of the mixed solution.

The electrochromic material may be diheptyl viologen dihexafluorophosphate, and the method of manufacturing the electrochromic material may include preparing a solution in which 1,1-diheptyl-4,4-bipyridinium dibromide is dissolved in a solvent, and adding $NH_4PF_6$ to the solution.

The electrochromic material may be ethyl viologen dibis (trifluoromethanesulfonyl)imide, the method of manufacturing the electrochromic material may include preparing a solution in which ethyl viologen dibromide is dissolved in a solvent, and adding lithium bis(trifluoromethanesulfonyl) imide to the solution.

Advantageous Effects

According to a composition for an electrochromic device and a method of manufacturing an electrochromic member according to embodiments of the present invention, improved optical transmission and elasticity may be obtained.

In addition, the composition for an electrochromic device has long lifespan and excellent durability.

In addition, the composition for an electrochromic device has flexibility and elasticity to be applicable to various fields.

In addition, the manufacturing method is simple to increase production efficiency and reduce manufacturing costs.

MODE FOR CARRYING OUT THE INVENTION

Figure 1:
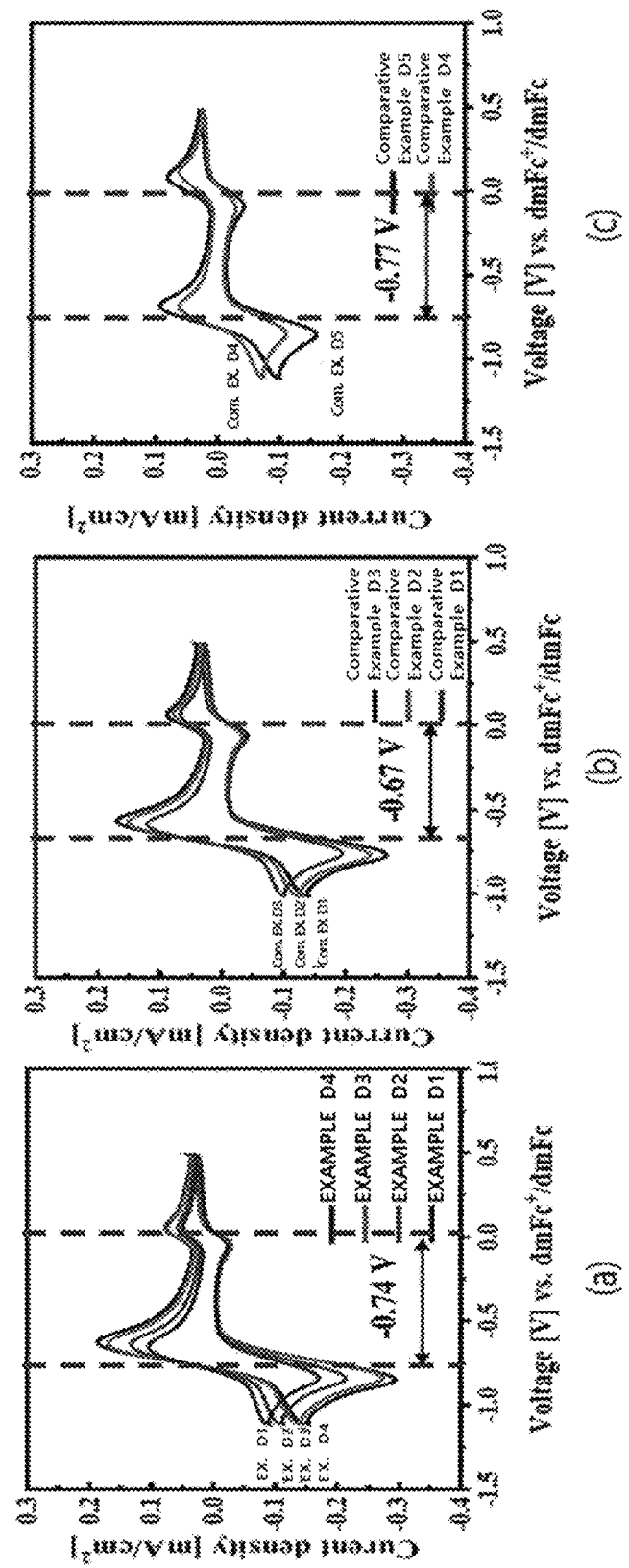
FIG. 1 shows results of measurement according to cyclic voltammetry when electrochromic materials are DHV[$PF_6$]$_2$, DBV[$PF_6$]$_2$, and DEV[$PF_6$]$_2$.

Hereinafter, preferred embodiments of the present invention will be described as follows with reference to the accompanying drawings. The invention may, however, be embodied in many different forms and should not be construed as being limited to the embodiments set forth herein. In addition, these embodiments of the present invention are provided so that the present invention will be thorough and complete, and will fully convey the scope of the invention to those skilled in the art. Therefore, in the drawings, the shapes and dimensions of elements may be exaggerated for clarity, and the same reference numerals will be used throughout to designate the same or like elements. The same symbol will be used to elements implementing similar function and operation in entire drawings. Moreover, throughout the entire description of the present invention, when one part is said to "include (or comprise)" an element, unless specifically mentioned otherwise, instead of excluding any other element, this may signify that the one part may further include other elements.

Composition for Electrochromic Device

A composition for an electrochromic device according to an embodiment of the present invention includes a light-transmitting polymer resin, a plasticizer, and an electrochromic material.

The polymer resin forms a basic body in the composition for an electrochromic device. The polymer resin may have optical transmission, flexibility, and elasticity when cured by the plasticizer. To this end, the polymer resin may be at least one of polyvinyl chloride (PVC), polytetrafluoroethylene (PTFE), polyurethane (PU), polymethyl methacrylate (PMMA), polydimethylsiloxane (PDMS), polyvinyl alcohol (PVA), polyvinylpyrrolidone (PVP), polyethylene oxide (PEO), polyimide (PI), and polyethylene terephthalate (PET). In particular, polyvinyl chloride (PVC) may be used to obtain high optical transmission, flexibility, and elasticity.

The plasticizer is a material that plasticizes the polymer resin. The plasticizer is not particularly limited, but may be DBA (dibutyl adipate).

The DBA may be represented by the following molecular formula.

[Molecular Formula]

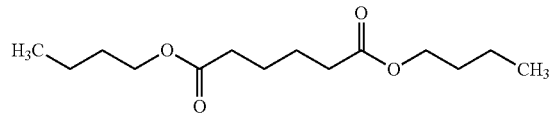

The plasticizer may be in an amount of 700 to 1200 parts by weight, preferably 800 to 1000 parts by weight, with respect to 100 parts by weight of the polymer resin. When the amount of the plasticizer is too low, crystals are easily formed in a manufactured electrochromic member, and when the amount of the plasticizer is too high, mechanical properties may be reduced.

The electrochromic material is a material whose color is changed through changes in wavelength absorbed by voltage applied from the outside. In an embodiment of the present invention, the electrochromic material may preferably be diheptyl viologen dihexafluorophosphate or ethyl viologen dibis(trifluoromethanesulfonyl)imide.

The diheptyl viologen dihexafluorophosphate may be indicated as DHV[$PF_6$]$_2$, and may be represented by Formula 1 below. The diheptyl viologen dihexafluorophosphate may provide a blue color or a cyan-based color when voltage is applied. When the electrochromic material is limited in this way, the light transmittance of an electrochromic device layer may be maintained high while the light transmittance is controlled according to the voltage and the color may be accurately achieved.

[Formula 1]

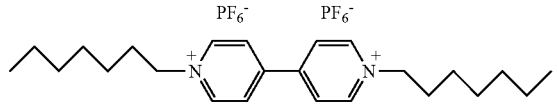

The ethyl viologen dibis(trifluoromethanesulfonyl)imide may be indicated as EV[TFSI]$_2$, and may be represented by Formula 2 below. The ethyl viologen dibis(trifluoromethanesulfonyl)imide may provide a blue color or a cyan-based color when voltage is applied. When the electrochromic material is limited in this way, the light transmittance of an electrochromic device layer may be maintained high while the light transmittance is controlled according to the voltage and the color may be accurately achieved.

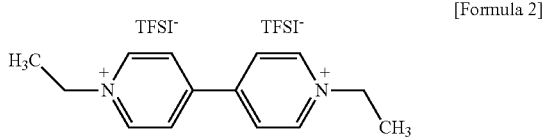

[Formula 2]

The electrochromic material may be in an amount of 5 to 20 parts by weight with respect to 100 parts by weight of the polymer resin. When the electrochromic material is diheptyl viologen dihexafluorophosphate, the electrochromic material may be preferably in an amount of 14 to 17 parts by weight. When the electrochromic material is ethyl viologen dibis(trifluoromethanesulfonyl)imide, the electrochromic material may be preferably in an amount of 8 to 13.5 parts by weight, more preferably 11 to 13.5 parts by weight. When the amount of the electrochromic material is too low, the light transmittance is hardly controlled and the color may not be accurately achieved. When the amount is too high, crystals are formed in the electrochromic layer, resulting in uneven discoloration.

In an embodiment, the composition for an electrochromic device may further include an ionic liquid. The ionic liquid is a material that may generally remain in a non-volatile liquid state at 100° C. and improve the movement of ions and electrons as well. Various ionic liquids may be used, but 1-ethyl-3-methylimidazolium bis(trifluoromethanesulfonyl)imide (EMIM-TFSI) may be preferably used. When the ionic liquid is limited in this way, the optical transmission of the electrochromic device layer may be maintained high. The EMIM-TFSI may be represented by Formula 3 below.

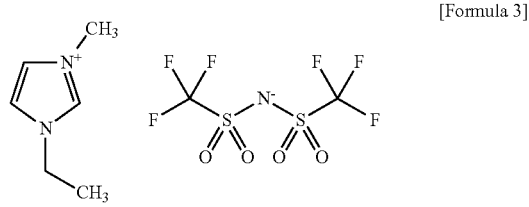

[Formula 3]

The ionic liquid may be in an amount of 100 to 200 parts by weight, preferably 150 to 170 parts by weight, with respect to 100 parts by weight of the polymer resin. When the amount of the ionic liquid is too high, the light transmittance may be reduced.

In an embodiment, the composition for an electrochromic device may further include an anode redox compound. The anode redox compound may be any one of ferrocene and dimethyl ferrocene, preferably dimethyl ferrocene. The dimethyl ferrocene may be represented by Formula 4 below.

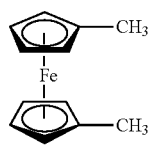

[Formula 4]

The anode redox compound may be in an amount of 1 to 5 parts by weight, preferably 1 to 7 parts by weight, with respect to 100 parts by weight of the polymer resin.

Electrochromic Device

An electrochromic device according to an embodiment of the present invention includes a first electrode, a second electrode, and an electrochromic device layer that is discolored by voltage applied to the first electrode and the second electrode, and the electrochromic device layer includes the composition for an electrochromic device described above.

The first electrode and the second electrode are ones generally used in electrical devices and are not particularly limited. However, the first electrode and the second electrode may be formed of ITO glass or ITO-PEN to obtain optical transmission, flexibility, and elasticity.

The electrochromic device layer includes the composition for an electrochromic device described above, and may be prepared in an appropriate size and thickness according to a manufacturing method, which will be described later.

Manufacturing Method of Electrochromic Member

A method of manufacturing an electrochromic member according to an embodiment of the present invention includes dissolving a polymer resin, a plasticizer, an ionic liquid, and an electrochromic material in a solvent to prepare a mixed solution, and removing the solvent of the mixed solution.

The polymer resin, the plasticizer, and the ionic liquid mixed in the preparing of a mixed solution are as described above.

In this step, when the electrochromic material is diheptyl viologen dihexafluorophosphate, the method of manufacturing the electrochromic material may include preparing a solution in which 1,1-diheptyl-4,4-bipyridinium dibromide is dissolved in a solvent, and adding $NH_4PF_6$ to the solution. The 1,1-diheptyl-4,4-bipyridinium dibromide may be indicated as $DHV(Br)_2$.

The solvent is a liquid capable of dissolving 1,1-diheptyl-4,4-bipyridinium dibromide, and may preferably be water. In this step, 1,1-diheptyl-4,4-bipyridinium dibromide may be put into water and stirred to be completely dissolved.

The adding of $NH_4PF_6$ to the solution may be performed by slowly dropping $NH_4PF_6$ onto the 1,1-diheptyl-4,4-bipyridinium dibromide solution.

Thereafter, the mixture was subjected to a reaction at room temperature to generate $DHV[PF_6]_2$. Then, the solvent may be removed, washed, and dried to finally prepare $DHV[PF_6]_2$.

In this step, when the electrochromic material is ethyl viologen dibis(trifluoromethanesulfonyl)imide, the method of manufacturing the electrochromic material may include preparing a solution in which ethyl viologen dibromide is dissolved in a solvent, and adding lithium bis(trifluoromethanesulfonyl)imide to the solution. The ethyl viologen dibromide is indicated as $EV(Br)_2$ and may be represented by Formula 5 below.

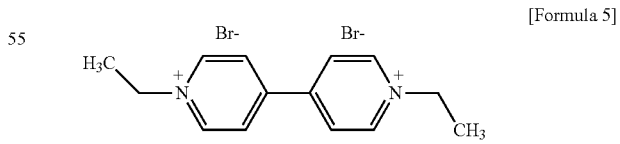

[Formula 5]

The solvent is a liquid capable of dissolving ethyl viologen dibromide, and may be preferably water. In this step, ethyl viologen dibromide may be put into water and stirred to be completely dissolved.

The adding of lithium bis(trifluoromethanesulfonyl)imide may be performed by slowly dropping lithium bis(trifluoromethanesulfonyl)imide onto the ethyl viologen dibromide solution. The lithium bis(trifluoromethanesulfonyl)imide may be indicated as LiTFSI, and may be represented by Formula 6 below.

[Formula 6]

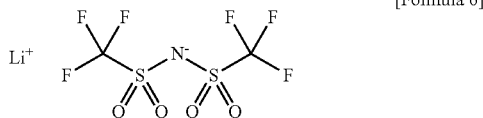

Thereafter, the mixture was subjected to a reaction at room temperature to generate EV[TFSI]$_2$. Then, the solvent may be removed, washed, and dried to finally prepare EV[TFSI]$_2$.

The solvent used in the preparing of the mixed solution may be a polar organic solvent. This is to easily dissolve polymer resins such as PVC. The polar organic solvent may be any one of dioxane, tetrahydrofuran (THF), acetone, dimethyl sulfoxide (DMSO), dimethylformamide (DMF), and 1-methyl-2-pyrrolidone (NMP).

The plasticizer added in this step may be added in an amount of 700 to 1200 parts by weight with respect to 100 parts by weight of the polymer resin, the ionic liquid may be in an amount of 100 to 200 parts by weight, and the electrochromic material may be in an amount of 5 to 20 parts by weight, preferably 5 to 14 parts by weight with respect to 100 parts by weight of the polymer resin. In addition, an anode redox compound in an amount of 1 to 7 parts by weight, preferably 1 to 5 parts by weight, with respect to 100 parts by weight of the polymer resin may be further added.

After this step, the removing of the solvent is performed. This step may be performed by leaving the solution mixed with various materials at room temperature for a long period of time, and a dryer or the like may be used if necessary. In addition, this step may be performed on a film or mold to obtain a desired shape and thickness.

Manufacturing Example: Preparation of Electrochromic Materials DHV[PF$_6$]$_2$, DBV[PF$_6$]$_2$, and DEV[PF$_6$]$_2$ To prepare DHV[PF$_6$]$_2$, an electrochromic material, 0.2 g of DHV(Br)$_2$ (TCI) was dissolved in 40 ml of water, and then 0.19 g of NH$_4$PF$_6$ was dissolved in another 40 ml of water. Then, the aqueous solution in which NH$_4$PF$_6$ was dissolved was added dropwise to the aqueous solution in which DHV(Br)$_2$ was dissolved. Thereafter, the mixed solution was left at 25° C. for 24 hours to generate DHV[PF$_6$]$_2$. The mixed solution was filtered under reduced pressure, washed with distilled water, and then dried at 80° C. for 24 hours using a vacuum oven.

To prepare DBV[PF$_6$]$_2$, an electrochromic material, 0.2 g of DBV(Cl)$_2$ (benzyl viologen dichloride, Alfa aeser) was dissolved in 40 ml of water, and then 0.2389 g of NH$_4$PF$_6$ was added dropwise thereto, so that a molar ratio of DBV(Cl)$_2$ and NH$_4$PF$_6$ was set to 1:3. Thereafter, the mixed solution was left at 25° C. for 24 hours to generate DBV[PF$_6$]$_2$. The mixed solution was filtered under reduced pressure, washed with distilled water, and then dried at 80° C. for 24 hours using a vacuum oven.

To prepare DEV[PF$_6$]$_2$, an electrochromic material, 0.2 g of DEV(Br)$_2$ (1,1'-diethyl-4, 4'-bipyridinium dibromide) was dissolved in 40 ml of water, and 0.34 g of NH$_4$PF$_6$ was added dropwise thereto. Thereafter, the mixed solution was left at 25° C. for 24 hours to generate DEV[PF$_6$]$_2$. The mixed solution was filtered under reduced pressure, washed with distilled water, and then dried at 80° C. for 24 hours using a vacuum oven.

Manufacturing Example: Preparation of Electrochromic Material EV[TFSI]$_2$ 0.2 g of EV(Br)$_2$ was dissolved in 40 ml of water, and 0.34 g of LiTFSI was dissolved in another 40 ml of water, and then the solution in which LiTFSI was dissolved was added dropwise to the solution in which of EV(Br)$_2$ was dissolved, so that a molar ratio of EV(Br)$_2$ and LiTFSI was set to 1:3. Thereafter, the mixed solution was left at 25° C. for 24 hours to generate EV[TFSI]$_2$. The mixed solution was filtered under reduced pressure, washed with distilled water, and then dried at 80° C. for 24 hours using a vacuum oven.

Manufacturing Example: Preparation of Electrochromic Member Using DHV[PF$_6$]$_2$, DBV[PF$_6$]$_2$, DEV[PF$_6$]$_2$ Example 1

0.3424 g of PVC (product of Scientific Polymer Products) as a polymer resin, 3.0816 g of DBA (product of TCI) as a plasticizer, 0.5478 g of EMIMTFSI (product of io-li-tec) as an ionic liquid, 0.0333 g of DHV[PF$_6$]$_2$ as an electrochromic material (previously prepared), and 0.0111 g of dimethyl ferrocene (product of TCI) as an anode redox compound were added to THF as a solvent and mixed.

Thereafter, the mixed solution was poured into a glass dish and dried by evaporating the solvent at room temperature for 3 days.

Example 2

Example 2 was prepared in the same manner as in Example 1, except that 0.0416 g of DHV[PF$_6$]$_2$ and 0.0138 g of dimethyl ferrocene were used.

Example 3

Example 3 was prepared in the same manner as in Example 1, except that 0.0499 g of DHV[PF$_6$]$_2$ and 0.0166 g of dimethyl ferrocene were used.

Example 4

Example 4 was prepared in the same manner as in Example 1, except that 0.0583 g of DHV[PF$_6$]$_2$ and 0.0194 g of dimethyl ferrocene were used.

Comparative Example 1

Comparative Example 1 was prepared in the same manner as in Example 1, except that 0.0325 g of DBV[PF$_6$]$_2$ (prepared previously) was used instead of DHV[PF$_6$]$_2$ and 0.0111 g of dimethyl ferrocene was used.

Comparative Example 2

Comparative Example 2 was prepared in the same manner as in Example 1, except that 0.0406 g of DBV[PF$_6$]$_2$ (prepared previously) was used instead of DHV[PF$_6$]$_2$ and 0.0138 g of dimethyl ferrocene was used.

Comparative Example 3

Comparative Example 3 was prepared in the same manner as in Example 1, except that 0.0487 g of DBV[PF$_6$]$_2$ (prepared previously) was used instead of DHV[PF$_6$]$_2$ and 0.0166 g of dimethyl ferrocene was used.

Comparative Example 4

Comparative Example 4 was prepared in the same manner as in Example 1, except that 0.0130 g of DEV[PF$_6$]$_2$ (prepared previously) was used instead of DHV[PF$_6$]$_2$ and 0.0055 g of dimethyl ferrocene was used.

Comparative Example 5

Comparative Example 5 was prepared in the same manner as in Comparative Example 4, except that 0.0196 g of DEV[PF$_6$]$_2$ and 0.008 g of dimethyl ferrocene were used.

Comparative Example 6

Comparative Example 6 was prepared in the same manner as in Comparative Example 4, except that 0.0261 g of DEV[PF$_6$]$_2$ and 0.0111 g of dimethyl ferrocene were used.

Manufacturing Example: Manufacture of Electrochromic Member Using EV[TFSI]$_2$

Example 5

0.3424 g of PVC (product of Scientific Polymer Products) as a polymer resin, 3.0816 g of DBA (product of TCI) as a plasticizer, 0.5478 g of EMIMTFSI (product of io-li-tec) as an ionic liquid, 0.02 g of EV[TFSI]$_2$ as an electrochromic material (previously prepared), and 0.0055 g of dimethyl ferrocene (product of TCI) as an anode redox compound were added to 25 ml of THF as a solvent and mixed.

Thereafter, the mixed solution was poured into a glass dish and dried by evaporating the solvent at room temperature for 3 days.

Example 6

Example 6 was prepared in the same manner as in Example 1, except that 0.03 g of EV[TFSI]$_2$ and 0.0083 g of dimethyl ferrocene were used.

Example 7

Example 7 was prepared in the same manner as in Example 1, except that 0.04 g of EV[TFSI]$_2$ and 0.0111 g of dimethyl ferrocene were used.

Example 8

Example 8 was prepared in the same manner as in Example 1, except that 0.045 g of EV[TFSI]$_2$ and 0.01244 g of dimethyl ferrocene were used.

Comparative Example 7

Comparative Example 7 was prepared in the same manner as in Example 1, except that 0.050 g of EV[TFSI]$_2$ and 0.01383 g of dimethyl ferrocene were used.

Comparative Example 8

Comparative Example 8 was prepared in the same manner as in Example 1, except that EV[TFSI]$_2$ was not added.

Manufacturing Example: Manufacture of Electrochromic Device

The previously prepared electrochromic member was placed on ITO glass, a spacer having a thickness of 100 μm was placed on an edge of the electrochromic member, and then the top was covered with another ITO glass. The electrochromic device manufactured in this way was defined as Examples D1 to D4 corresponding to Examples 1 to 4 of the electrochromic member, and as Examples E5 to E8 for Examples 5 to 8, respectively, and defined as Comparative Examples D1 to D6 corresponding to Comparative Examples 1 to 6, and as Comparative Examples E7 and E8 for Comparative Examples 7 and 8.

Experimental Example: Visual Inspection

Examples 1 to 8 and Comparative Examples 1 to 8 were visually inspected to determine any abnormality. It is determined that in Comparative Examples 3, 6, and 7, crystals were formed inside.

Experimental Example: Cyclic Voltammetry Measurement (1)

Current/potential curves according to cyclic voltammetry for Examples D1 to D4 and Comparative Examples D1 to D6 were obtained using a biologics (SP240) under the condition of 20 mVs-1. FIG. 1 shows the results of this experiment. Referring to FIG. 1, it is seen that Examples D1 to D4 show a clear change in current compared to Comparative Example, and in particular, Examples D3 and D4 are clearer.

Experimental Example: Light Absorption Rate Measurement

Figure 2:
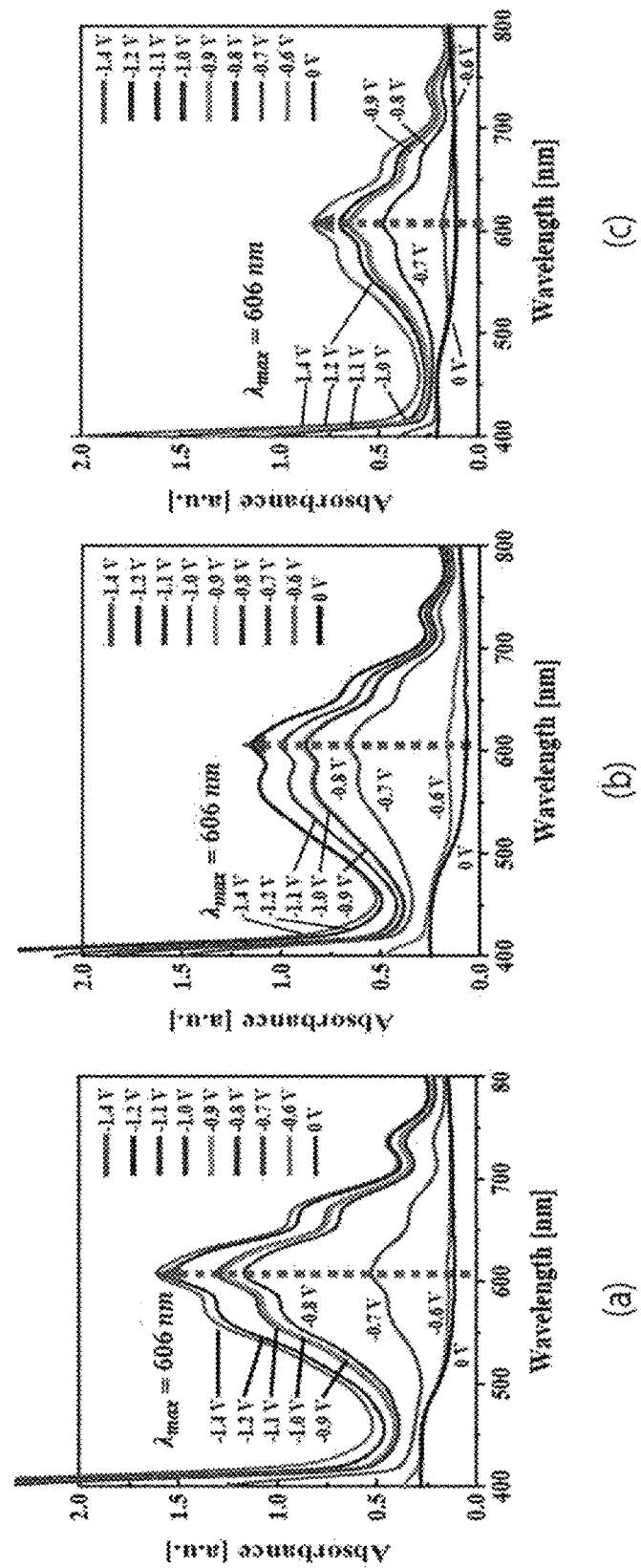
FIG. 2 shows results of measuring light absorption when electrochromic materials are DHV[$PF_6$]$_2$, DBV[$PF_6$]$_2$, and DEV[$PF_6$]$_2$.

Example D4, Comparative Example D2, and Comparative Example D5 were measured in the range of 400 to 800 nm using a UV-Vis spectrometer (UV-Vis Spectrometer, Perkin Elmer, Lambda 465). FIG. 2(*a*) shows the experimental results of Example D4, FIG. 2(*b*) shows the experimental results of Comparative Example D2, and FIG. 2(*c*) shows the experimental results of Comparative Example D5. Referring to FIG. 2, in Example D4, it is seen that the absorption rate for the 606 nm wavelength is the highest, and the light absorption rate is regulated according to the applied voltage. In Comparative Example, the light absorption rate at around 606 nm is higher than those at other wavelengths, but the difference in absorption amount is not large compared to Example.

Experimental Example: Color Expression Experiment

Figure 3:
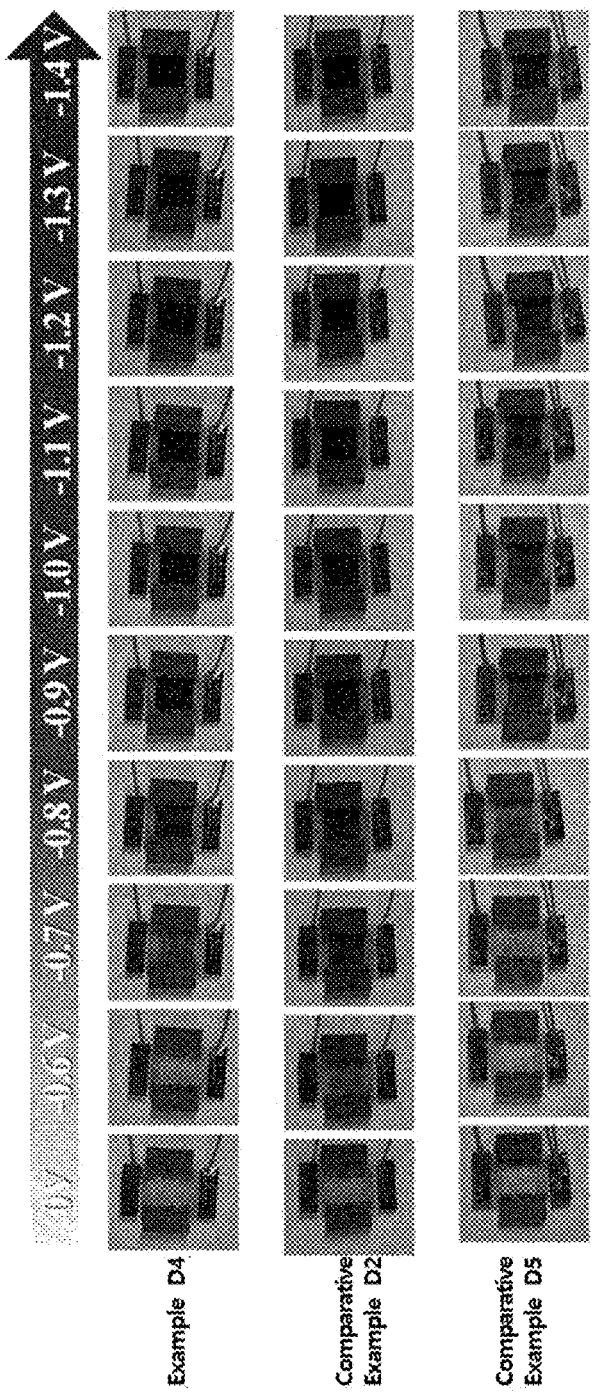
FIG. 3 is an image of a degree of color expression according to potential when electrochromic materials are DHV[$PF_6$]$_2$, DBV[$PF_6$]$_2$, and DEV[$PF_6$]$_2$.

Example D4, Comparative Example D2, and Comparative Example D5 were observed on changes in color by applying a voltage from 0 V to −1.4 V. FIG. 3 shows the results of this experiment. Referring to FIG. 3, in Example D4, the control of color according to the applied voltage was the clearest, and compared to Comparative Example, the color was dark blue.

Experimental Example: Light Transmittance Test (1)

Figure 4:
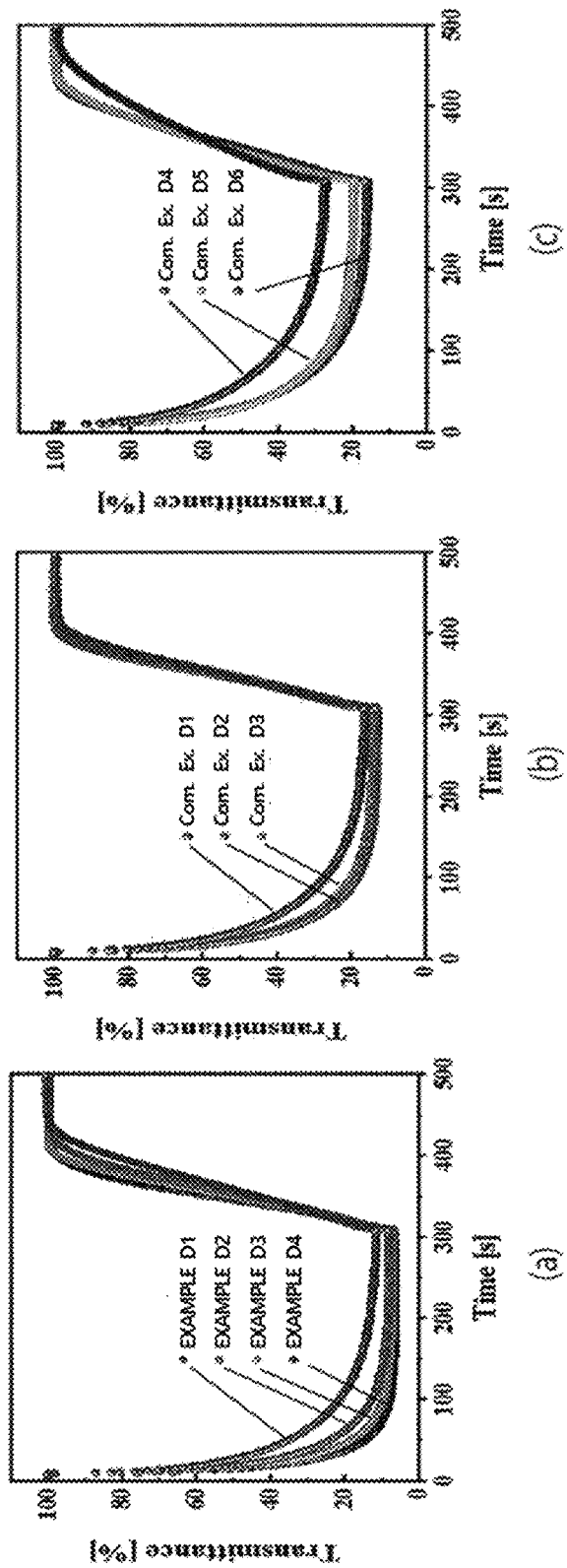
FIG. 4 shows light transmittance test results when electrochromic materials are DHV[$PF_6$]$_2$, DBV[$PF_6$]$_2$, and DEV[$PF_6$]$_2$.

For Examples D1 to D4 and Comparative Examples D1 to D6, the transmittance of light having a wavelength of 606 nm was measured. In this case, changes in light transmittance was observed during coloring and decoloring by applying and blocking voltage. FIG. 4 shows the results of this experiment. Referring to FIG. 4, a degree of change in light transmittance of Example is greater than that of Comparative Example, and even within the Examples, Examples D3 and D4 have greater degree of change in light transmittance than other Examples.

Experimental Example: Analysis on Optical Density Vs. Charge Density (1)

Figure 5:
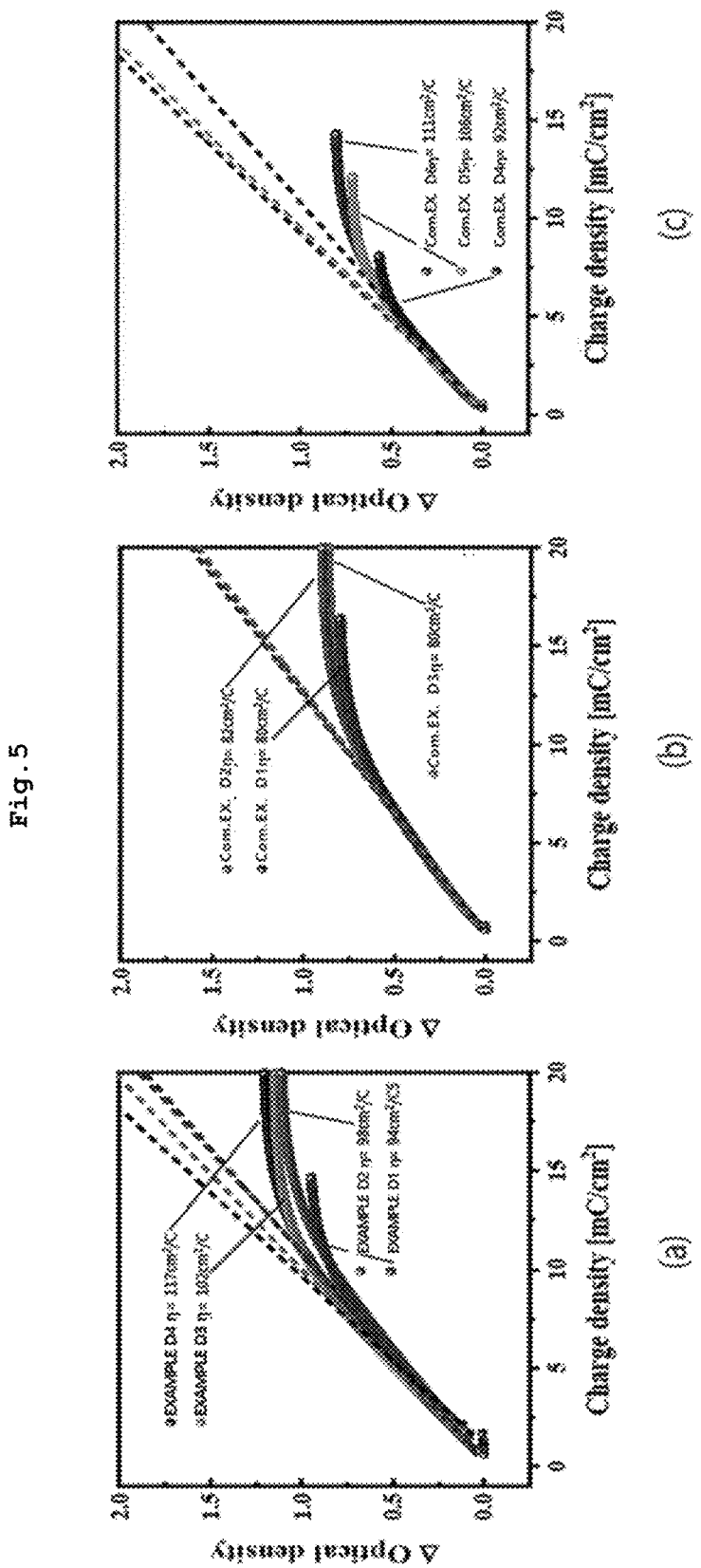
FIG. 5 shows results of analysis on optical density versus charge density when electrochromic materials are DHV[$PF_6$]$_2$, DBV[$PF_6$]$_2$, and DEV[$PF_6$]$_2$.
Figure 8:
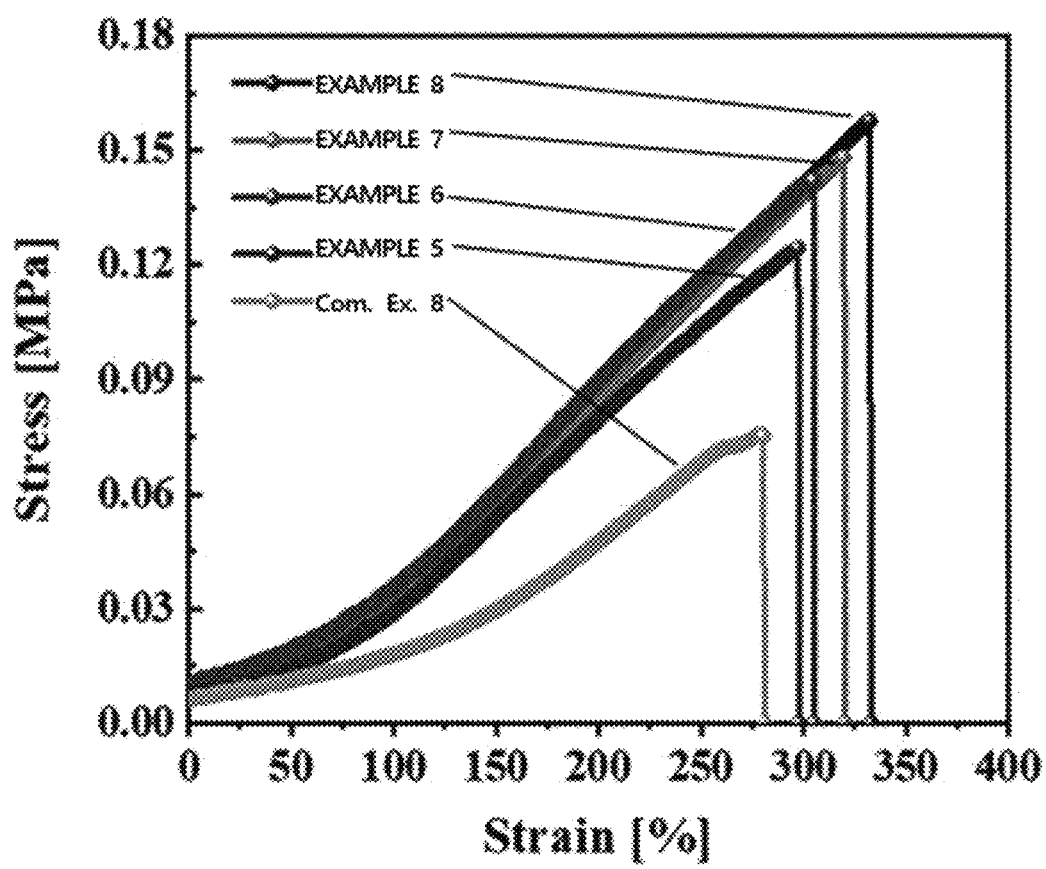
FIG. 8 shows tensile strength-strain measurement results when an electrochromic material is EV[TFSI]$_2$.

At 606 nm and −1.0 V, the optical density vs. charge density relationship was analyzed for Examples D1 to D4 and Comparative Examples D1 to D6, and coloration efficiency ($\eta$) was determined. FIG. 8 shows the results of this experiment. Referring to FIG. 5, it is seen that the coloration efficiency ($\eta$) of Example is greater than that of Comparative Example, and in particular, the increase in coloration efficiency ($\eta$) is greater in Examples 6 to 8, and even within the Examples, Examples D3 and D4 have a greater increase.

Figure 6:
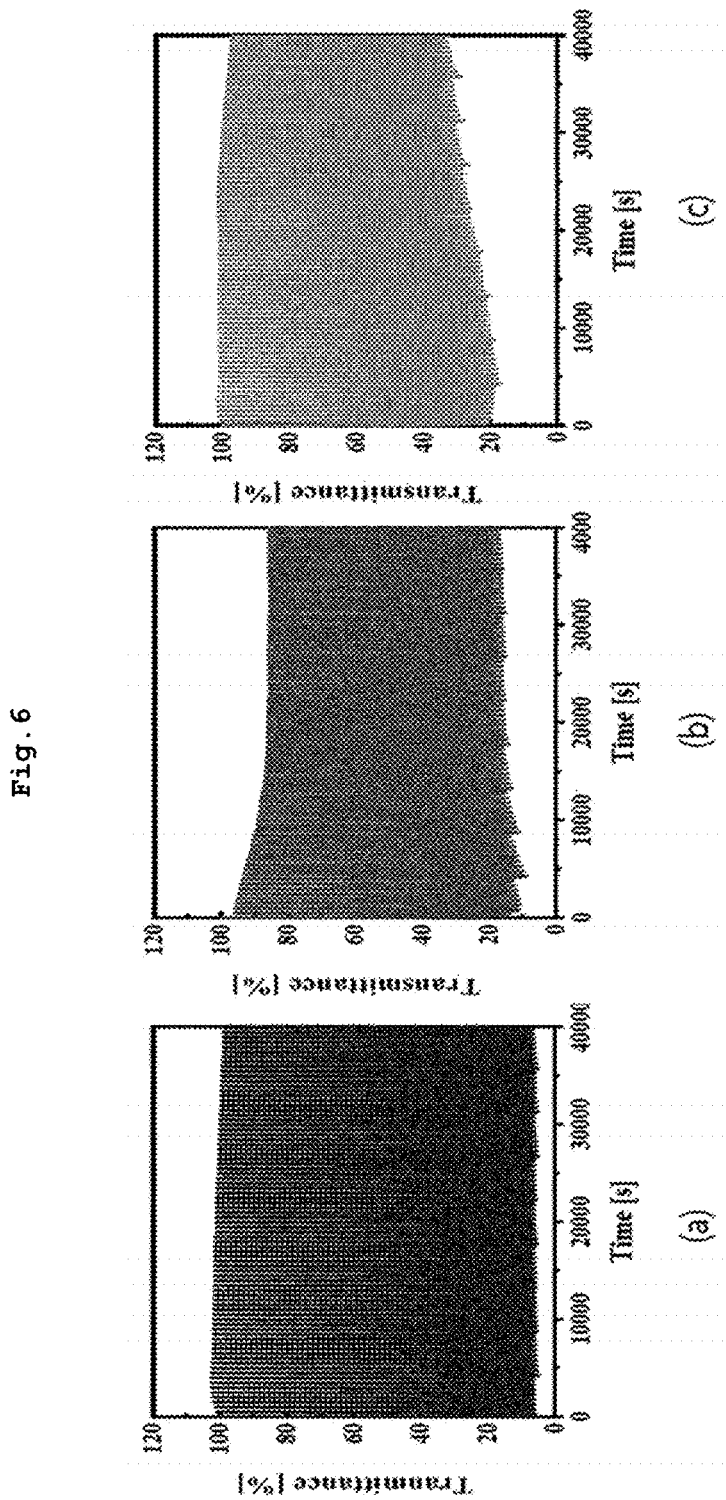
FIG. 6 shows coloring/decoloring cycle test results when electrochromic materials are DHV[$PF_6$]$_2$, DBV[$PF_6$]$_2$, and DEV[$PF_6$]$_2$.

Experimental Example: Light Transmittance Test According to Repeated Cycles of Coloring/Decoloring As for Example D4 and Comparative Examples D2 and D5, coloring and discoloring were repeated by repeatedly by applying voltage, and a degree of transmittance of light having a wavelength of 606 nm for 40,000 seconds was measured. In this case, changes in light transmittance was observed during coloring and decoloring by applying and blocking voltage. FIG. 6 shows the results of this experiment, (a) is the result of Example D4, (b) is the result of Comparative Example D2, (c) is the result of Comparative Example D5. Referring to FIG. 6, it is seen that the light transmittance of Example D4 was maintained constant during the cycle period, but the light transmittance of Comparative Examples D2 and D5 decreased.

Experimental Example: Impedance Property Measurement

Figure 7:
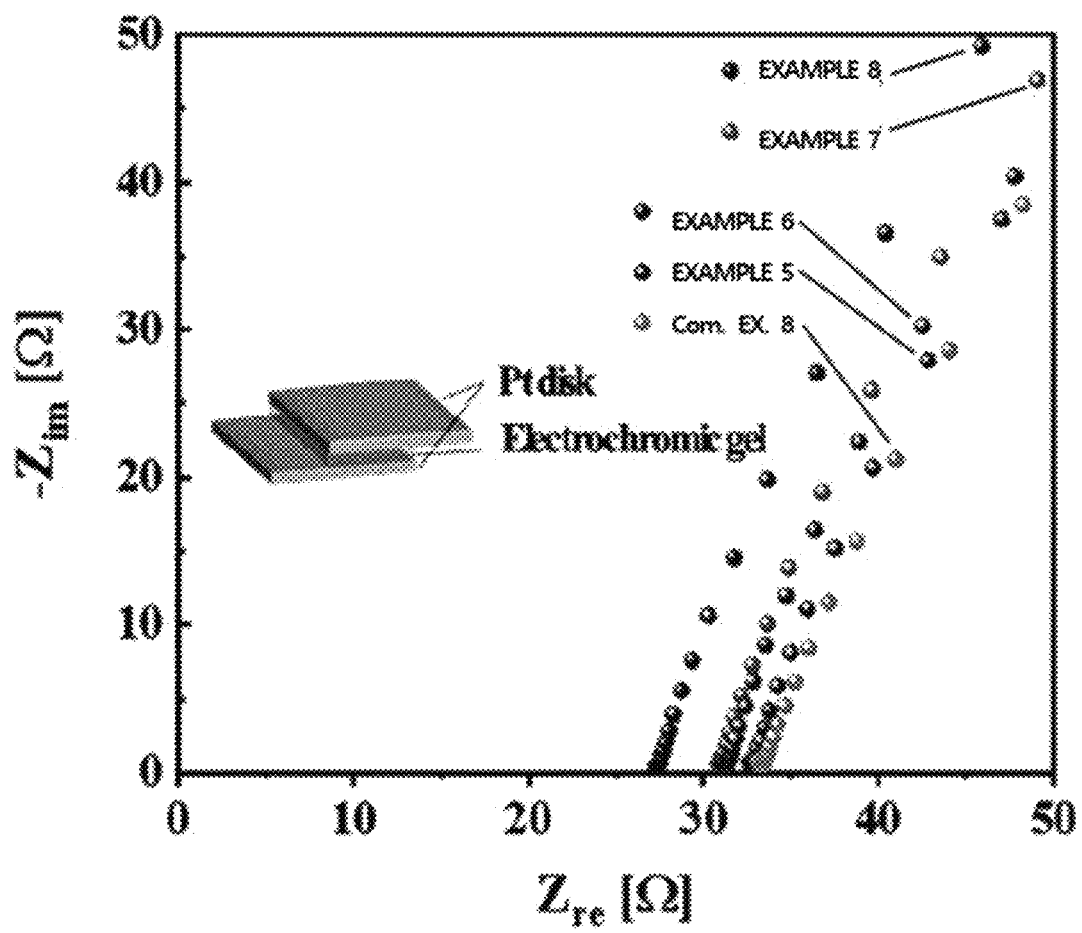
FIG. 7 is a nyquist plot showing impedance test results when an electrochromic material is EV[TFSI]$_2$.

The electrochromic members prepared in Examples 5 to 8 and Comparative Example 8 were placed between platinum electrodes, and impedance spectra were measured using an impedance spectrometer. FIG. 7 is a nyquist plot showing the results of this experiment. Referring to FIG. 7, it is seen that Example 5 has no significant difference in properties from Comparative Example 8, and in Example 8, the properties are improved compared to Comparative Example 8.

Experimental Example: Tensile Strength-Strain Measurement

Examples 5 to 8 and Comparative Example 8 were targeted, and measured using a universal testing machine (UTM, Tinius Olsen, H5KT), and the measurement was performed according to ASTM D638 type V. FIG. 8 shows the results of this experiment. Referring to FIG. 8, it is seen that Example has a significantly higher tensile strength than Comparative Example 8, and in particular, Examples 6 to 8 are more excellent.

Experimental Example: Compressive Load Test

Figure 9:
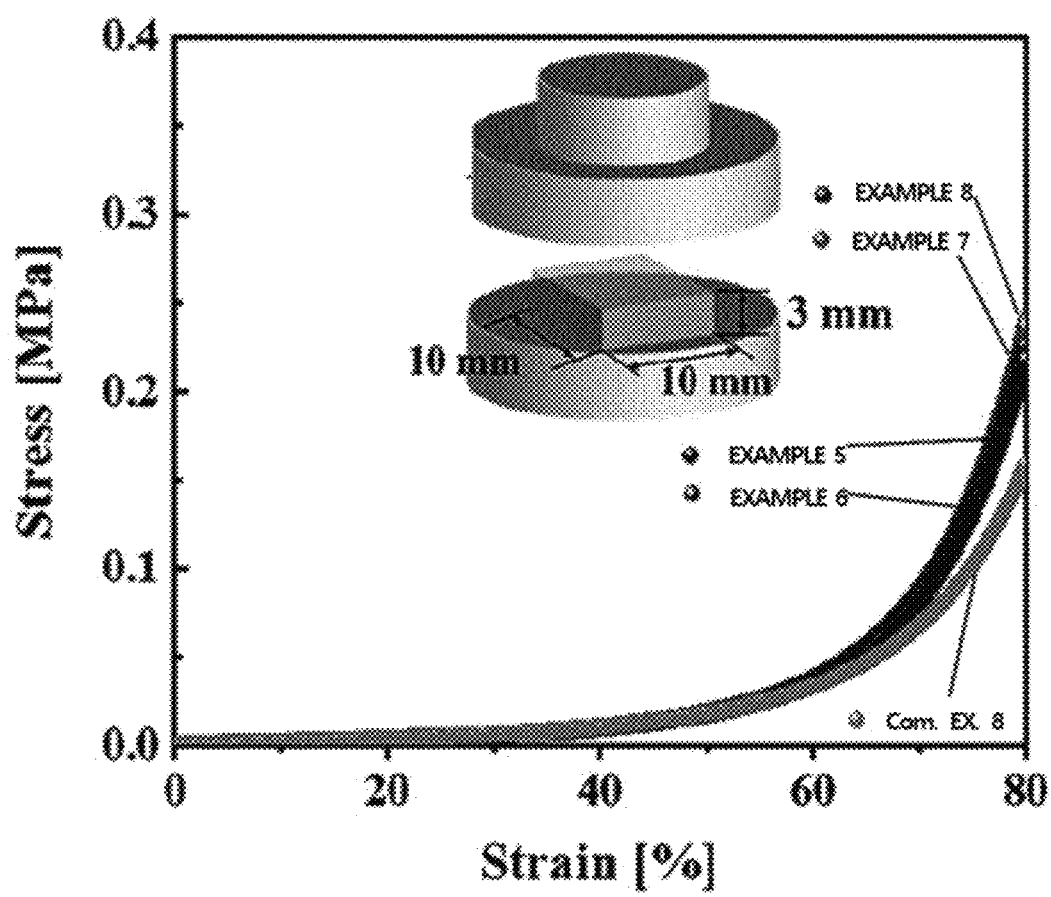
FIG. 9 shows compressive load test results when an electrochromic material is EV[TFSI]$_2$.

Examples 5 to 8 and Comparative Example 8 were each cut to a thickness of 3 mm and 10 mm in width and length, and the test was performed while pressing at a speed of 10 mm/min using a compressive load tester. FIG. 9 shows the results of this experiment. Referring to FIG. 9, it is seen that the compression properties of Example 8 are greater than that of Comparative Example 8.

Experimental Example: Evaporation Test

Figure 10:
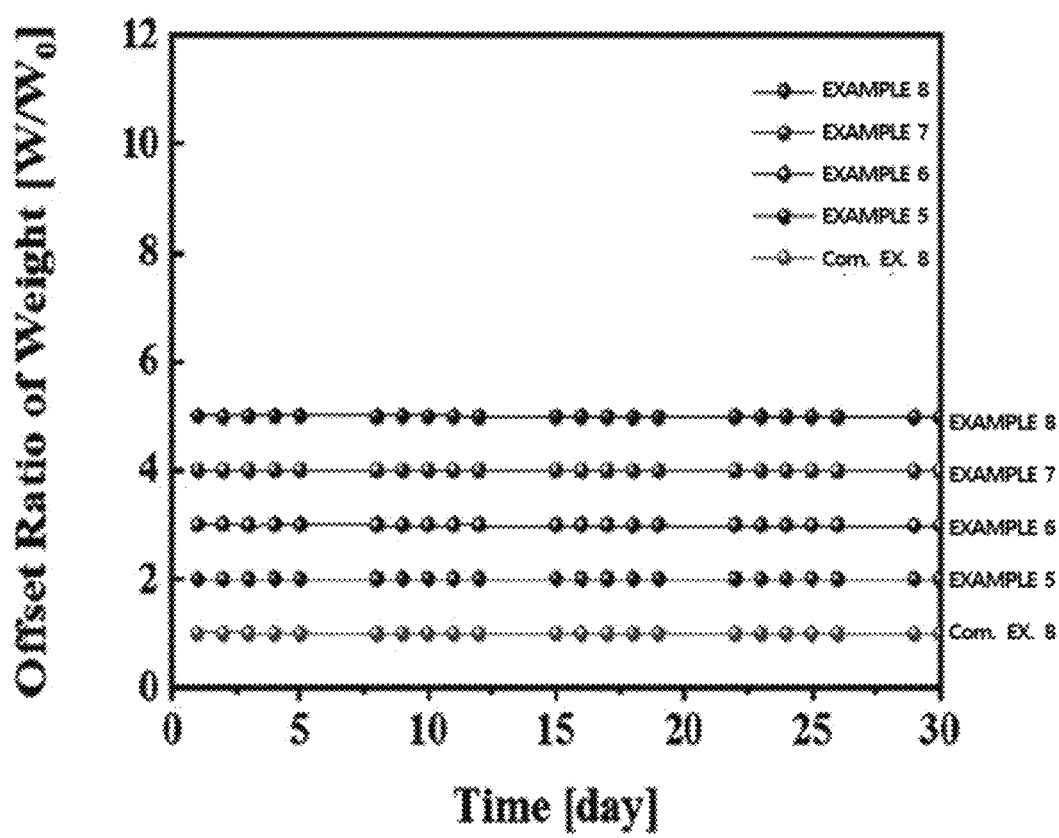
FIG. 10 shows evaporation test results when an electrochromic material is EV[TFSI]$_2$.

Examples 5 to 8 and Comparative Example 8 were cut to a certain size, and maintained at 20 to 27° C. and 19 to 40% RH for 30 days at room temperature to measure the weight of those samples. FIG. 10 shows the results of this experiment. Referring to FIG. 10, it is seen that the weight shows no change even when the amount of the electrochromic material is increased.

Experimental Example: Cyclic Voltammetry Measurement (2)

Figure 11:
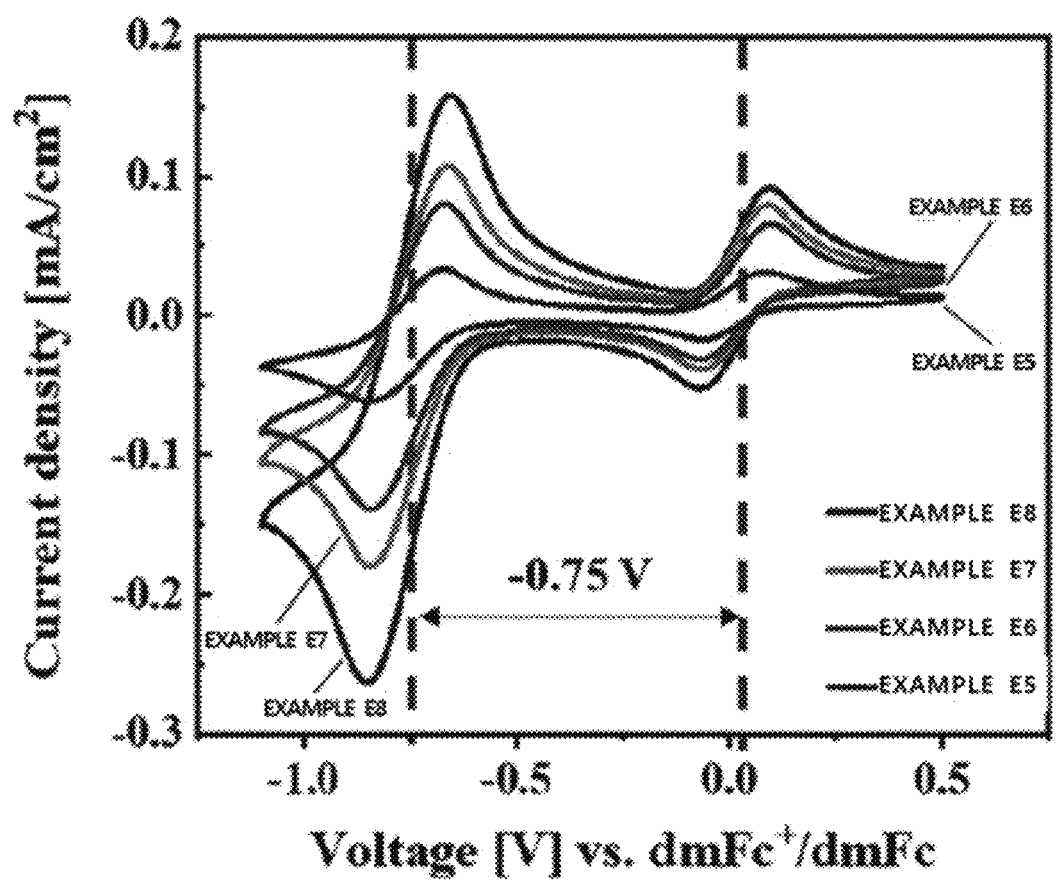
FIG. 11 shows results of measurement according to cyclic voltammetry when an electrochromic material is EV[TFSI]$_2$.

Current/potential curves according to cyclic voltammetry for Examples E5 to E8 were obtained using a biologics (SP240) under the condition of 20 mVs-1. FIG. 11 shows the results of this experiment. Referring to FIG. 11, it is seen that the greater the amount of the electrochromic material, the clearer the change in current.

Experimental Example: Light Absorption Rate Measurement

Figure 12:
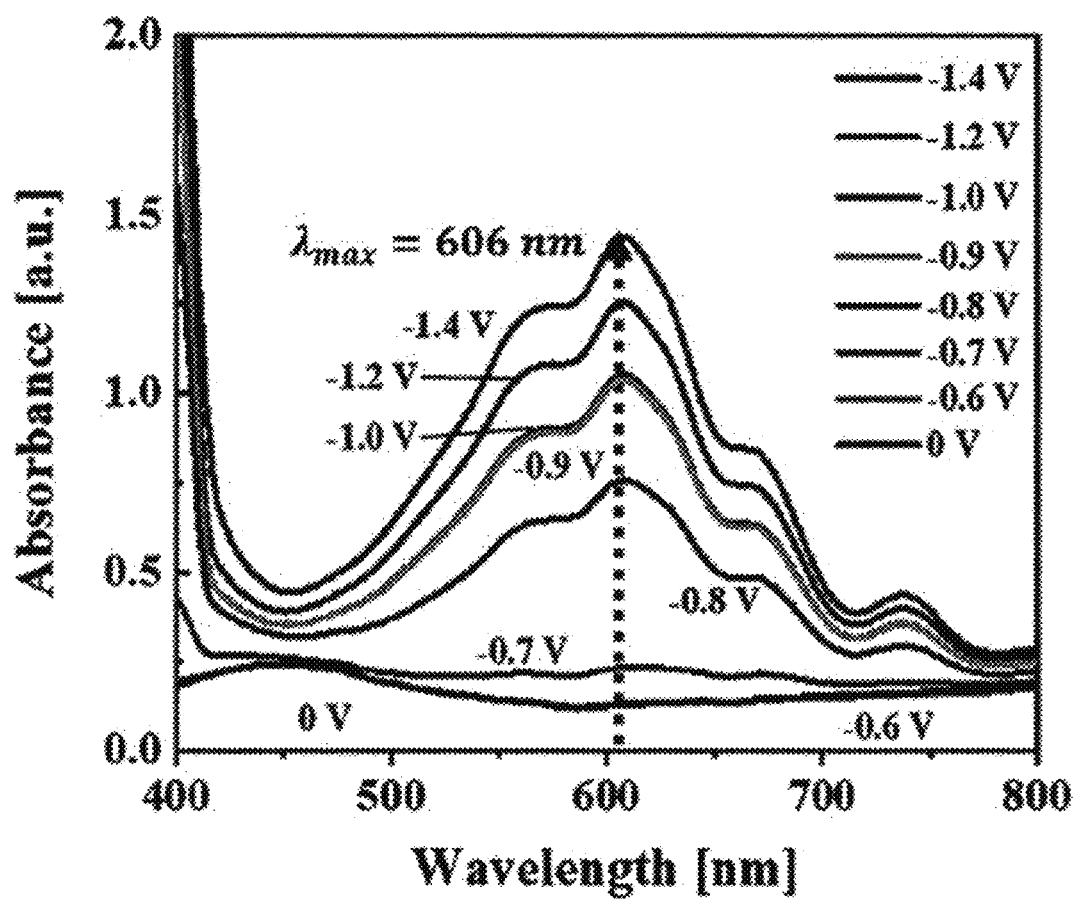
FIG. 12 shows results of measuring light absorption rates when an electrochromic material is EV[TFSI]$_2$.

Example E8 was measured in the range of 400 to 800 nm using a UV-Vis spectrometer (UV-Vis Spectrometer, Perkin Elmer, Lambda 465). FIG. 12 shows the results of this experiment. Referring to FIG. 12, it is seen that the absorption rate for the 606 nm wavelength is the highest, and the light absorption rate is regulated according to the applied voltage.

Experimental Example: Light Transmittance Test (2)

Figure 13:
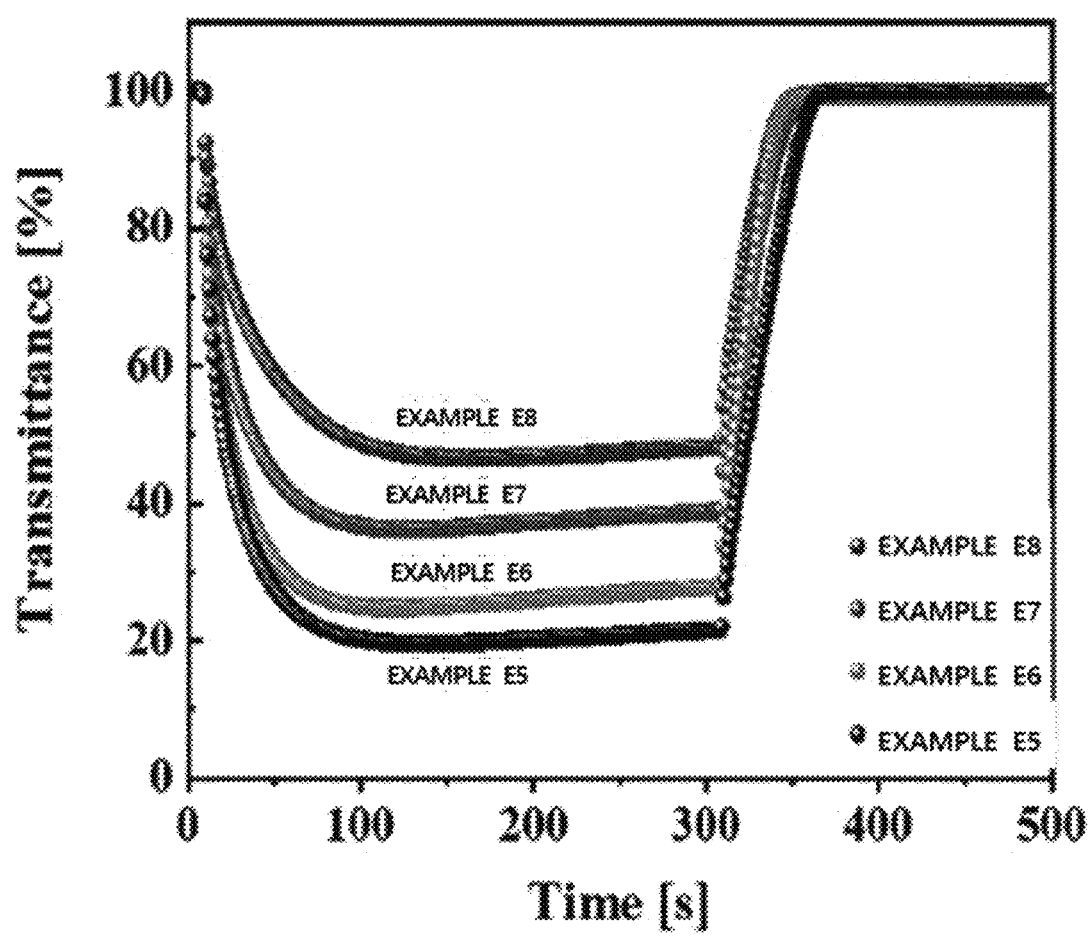
FIG. 13 shows results of light transmittance experiments when an electrochromic material is EV[TFSI]$_2$.

For Examples E5 to E8, a degree of transmittance of light having a wavelength of 606 nm was measured. In this case, changes in light transmittance was observed during coloring and decoloring by applying and blocking voltage. FIG. 13 shows the results of this experiment. Referring to FIG. 13, it is seen that the higher the amount of the electrochromic material, the greater the degree of change in light transmittance, and in particular, the degree of change in light transmittance of Examples E7 and E8 is very excellent.

Experimental Example: Analysis on Optical Density Vs. Charge Density (2)

Figure 14:
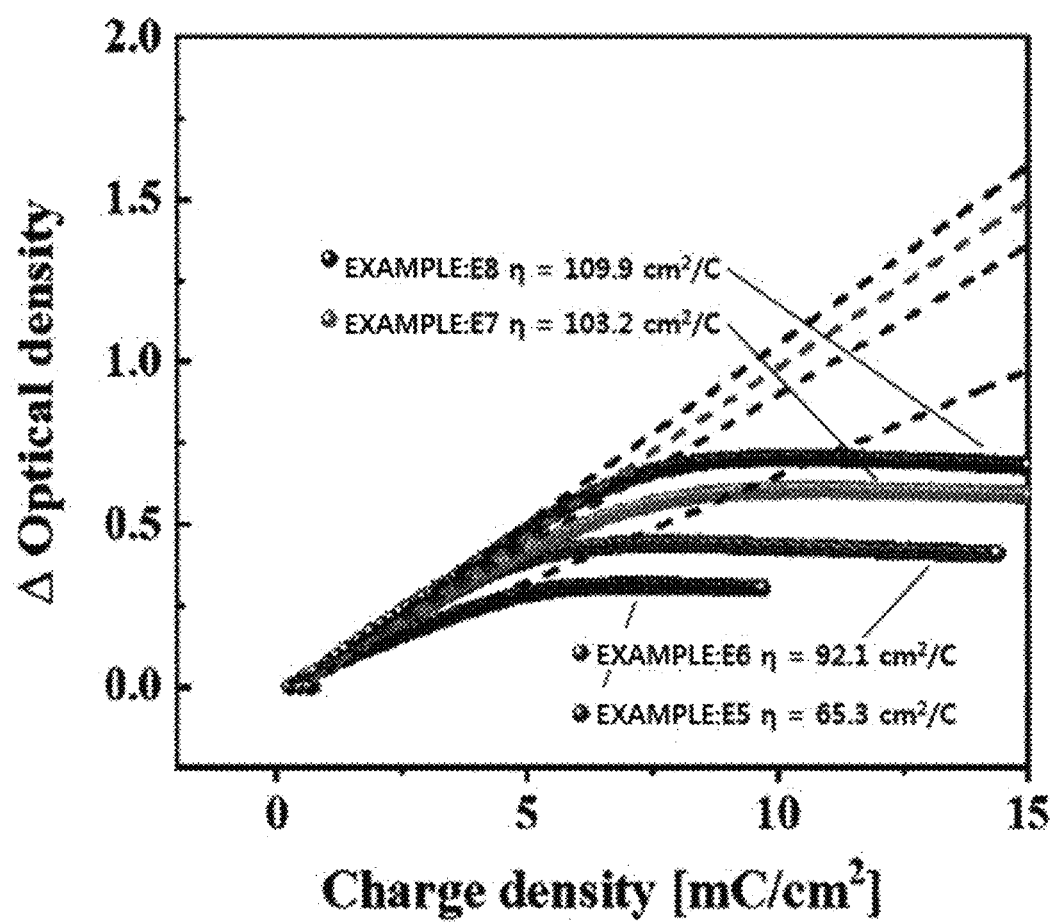
FIG. 14 shows results of analysis on optical density versus charge density when an electrochromic material is EV[TFSI]$_2$.

At 606 nm and −1.0 V, the optical density vs. charge density relationship was analyzed for Examples E5 to E8, and coloration efficiency ($\eta$) was determined. FIG. 14 shows the results of this experiment. Referring to FIG. 14, it is seen that the higher the amount of the electrochromic material, the greater the coloration efficiency ($\eta$), and in particular, the increase in coloration efficiency ($\eta$) is prominent in Examples E6 to E8.

The present invention is not limited to the above-described embodiments and the accompanying drawings, and is intended to be limited by the appended claims. Accordingly, various forms of substitution, modification, and alteration may be made by those skilled in the art without departing from the technical spirit of the present invention described in the claims, which may be also within the scope of the present invention.

The invention claimed is:

1. A composition for an electrochromic device comprising:
   a light-transmitting polymer resin;
   a plasticizer; and
   an electrochromic material,
   wherein the electrochromic material is selected from a group consisting of diheptyl viologen dihexafluorophosphate and ethyl viologen dibis(trifluoromethanesulfonyl)imide, wherein,
   when the electrochromic material is diheptyl viologen dihexafluorophosphate, the electrochromic material is contained in an amount of 14 to 17 parts by weight per 100 parts by weight of the light-transmitting polymer resin, and
   when the electrochromic material is ethyl viologen dibis(trifluoromethanesulfonyl)imide, the electrochromic material is contained in an amount of 11 to 14 parts by weight per 100 parts by weight of the light-transmitting polymer resin.

2. The composition for an electrochromic device of claim 1, wherein the electrochromic material is the diheptyl viologen dihexafluorophosphate, and is represented by Formula 1 below:

[Formula 1]

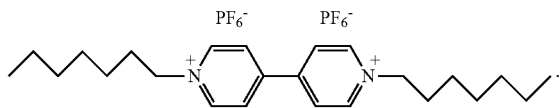

3. The composition for an electrochromic device of claim 1, wherein the electrochromic material is the ethyl viologen dibis(trifluoromethanesulfonyl)imide, and is represented by Formula 2 below:

[Formula 2]

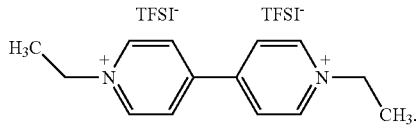

4. The composition for an electrochromic device of claim 1, further comprising an ionic liquid in an amount of 100 to 200 parts by weight with respect to 100 parts by weight of the polymer resin.

5. The composition for an electrochromic device of claim 1, further comprising an anode redox compound in an amount of 1 to 7 parts by weight with respect to 100 parts by weight of the polymer resin.

6. An electrochromic device comprising:
   a first electrode;
   a second electrode; and
   an electrochromic device layer discolored by voltage applied to the first electrode and the second electrode;
   wherein the electrochromic device layer includes the composition for an electrochromic device of claim 1.

7. A method of manufacturing an electrochromic member, the method comprising:
   dissolving a polymer resin, a plasticizer, an ionic liquid, and an electrochromic material in a solvent to prepare a mixed solution; and
   removing the solvent of the mixed solution,
   wherein the electrochromic material is selected from the group consisting of diheptyl viologen dihexafluorophosphate and ethyl viologen dibis(trifluoromethanesulfonyl)imide, wherein,
   when the electrochromic material is diheptyl viologen dihexafluorophosphate, the electrochromic material is contained in an amount of 14 to 17 parts by weight per 100 parts by weight of the polymer resin, and
   when the electrochromic material is ethyl viologen dibis(trifluoromethanesulfonyl)imide, the electrochromic material is contained in an amount of 11 to 14 parts by weight per 100 parts by weight of the polymer resin.

8. The method of claim 7, wherein the electrochromic material is diheptyl viologen dihexafluorophosphate, and is prepared through the following manufacturing method:
   preparing a solution in which 1,1-diheptyl-4,4-bipyridinium dibromide is dissolved in a solvent; and
   adding $NH_4PF_6$ to the solution.

9. The method of claim 7, wherein the electrochromic material is ethyl viologen dibis(trifluoromethanesulfonyl)imide, and is prepared through the following manufacturing method:
   preparing a solution in which ethyl viologen dibromide is dissolved in a solvent; and
   adding lithium bis(trifluoromethanesulfonyl)imide to the solution.

10. The method of claim 7, wherein in the preparing of the mixed solution,
   the plasticizer is in an amount of 700 to 1200 parts by weight with respect to 100 parts by weight of the polymer resin,
   the ionic liquid is in an amount of 100 to 200 parts by weight.

11. The method of claim 7, wherein in the preparing of the mixed solution,
   an anode redox compound is further added in an amount of 1 to 7 parts by weight with respect to 100 parts by weight of the polymer resin.

* * * * *